Oct. 1, 1968 H. MOORE 3,403,711
TOOL HAVING RETRACTABLE AND REMOVABLE CENTERING SLEEVE
Filed May 29, 1967 2 Sheets-Sheet 1
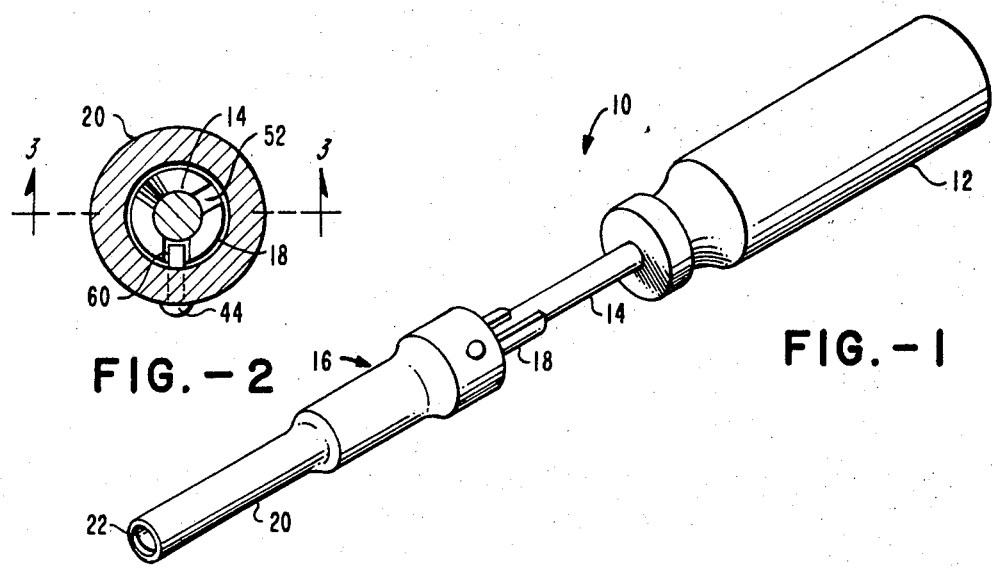
FIG.-1
FIG.-2
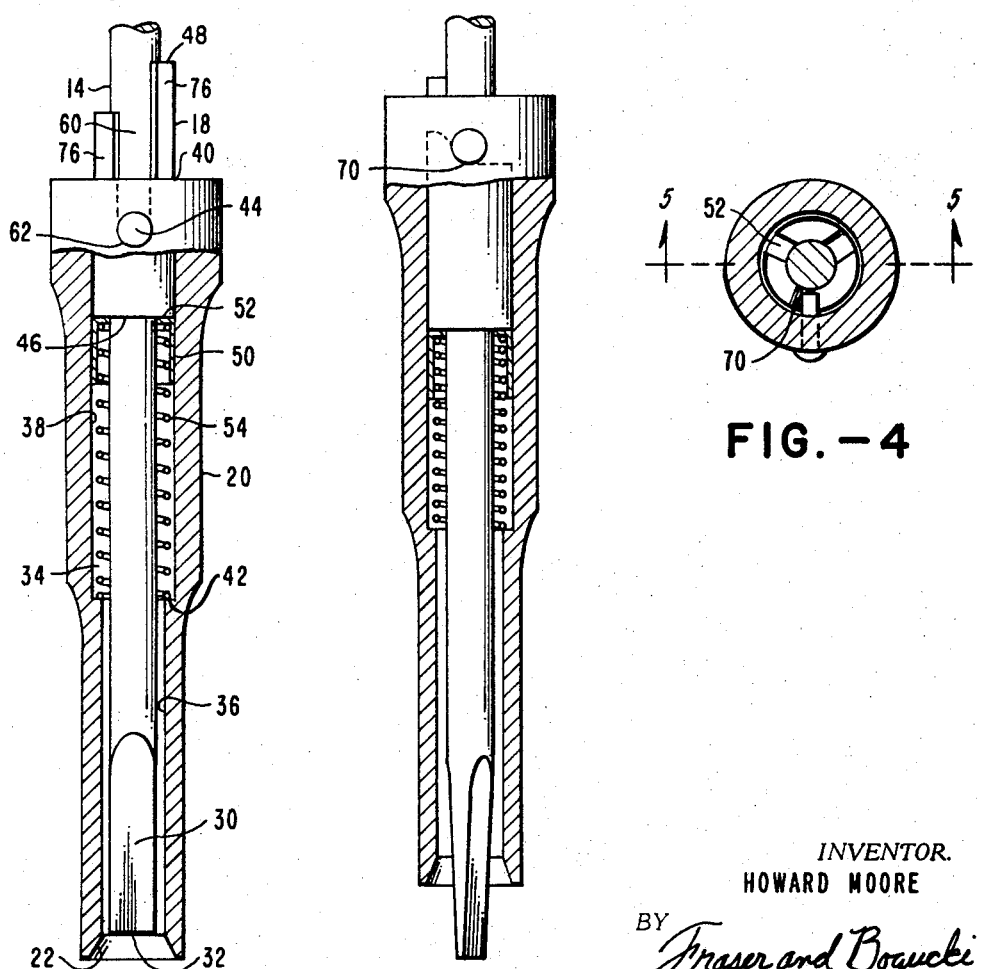
FIG.-3 FIG.-5 FIG.-4
*INVENTOR.*
HOWARD MOORE
BY *Fraser and Bogucki*
ATTORNEYS

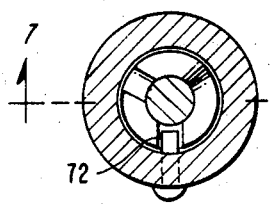 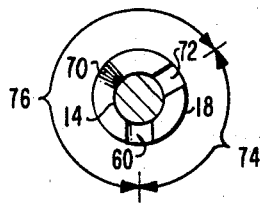 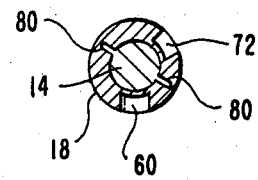
FIG.-6  FIG.-8  FIG.-12
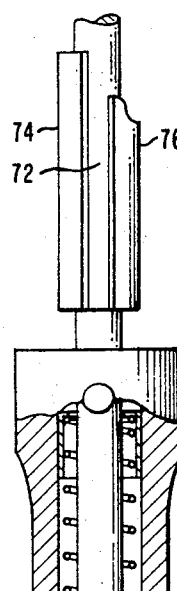 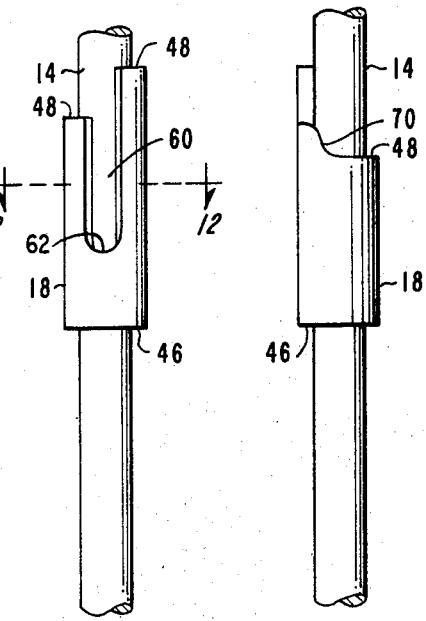 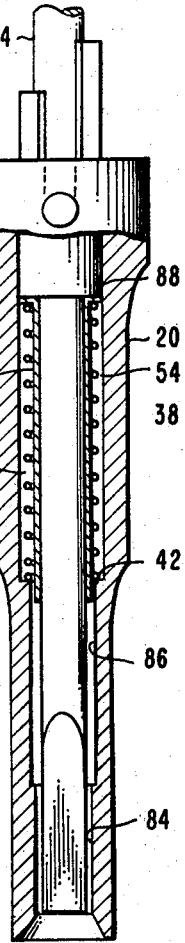
FIG.-9  FIG.-10
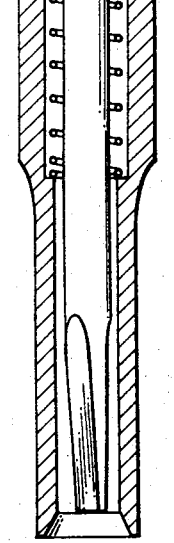 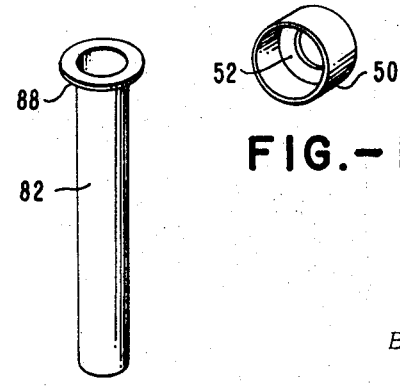
FIG.-11
FIG.-7  FIG.-14
FIG.-13
INVENTOR.
HOWARD MOORE

United States Patent Office 3,403,711
Patented Oct. 1, 1968

3,403,711
TOOL HAVING RETRACTABLE AND REMOVABLE CENTERING SLEEVE
Howard Moore, 5719, Wallis Lane, Woodland Hills, Calif. 91364
Filed May 29, 1967, Ser. No. 641,770
10 Claims. (Cl. 145—51)

ABSTRACT OF THE DISCLOSURE

A tool having a working tip at the end of a shank is provided with a retractable and removable centering sleeve assembly. A hollow cylindrical sleeve which is slidably mounted on the shank is held in selected positions relative to the shank tip by the engagement of a sleeve mounted pin with a cylindrical guide mounted on the shank. The sleeve is spring-biased into an operative position by engaging the pin in a first groove in the guide and into a retracted position by positioning the pin at the one end of the guide. Engagement of the pin within a second groove in the guide permits complete removal of the sleeve from the shank.

BACKGROUND OF THE INVENTION

1. Field of the invention

The present invention relates to tools having centering devices for enhancing the engagement of the working tip of the tool with generally circular objects to be manipulated by the tool, and more particularly to screwdrivers and related tools having centering sleeves which are adjustable relative to the tip thereof.

2. Description of the prior art

Many different devices have been proposed for aiding in the insertion and retention of the working tip of a tool such as a screwdriver blade within a slot in a generally circular piece of work such as the conventional screw head. One type of device which has proven to be particularly successful is a hollow, generally cylindrically shaped centering sleeve which extends beyond the tip and blade of a screwdriver to surround part or all of the screw head. The centering sleeve must normally be made at least partially retractable so as not to interfere with proper screw engagement if the screw head is to be driven flush with a surface.

In most known arrangements centering sleeve assemblies are relatively complex and are added as a permanent part of the tool during its manufacture. Standard tools without such assemblies are not easily equipped with them, and duplicate sets of tools must be acquired if it is desired to have tools both with and without such assemblies.

Certain work applications such as in cases of limited access or where the tool is to be used for prying may dictate the removal of a centering sleeve assembly. Few if any known tools have sleeve assemblies which are completely removable, a situation which again may rquire separate sets of tools if work versatility is to be realized.

SUMMARY OF THE INVENTION

In brief, the present invention provides a tool having a centering sleeve assembly, which is easily retracted from the working tip or completely removed from the tool as desired. A hollow, generally cylindrically shaped centering sleeve is slidably concentrically mounted on the shank of the tool. The sleeve is spring biased in a direction toward the working tip to hold the sleeve in a selected position when a pin extending from the inner wall of the the sleeve is engaged with a cylindrical guide member mounted on the shank. A first groove extends from the end of the cylindrical guide member opposite the tip along a portion of the length of such guide, and engagement of the pin in the first groove holds the sleeve in its operative position. The pin may also be engaged with a ridged portion at the end of the cylindrical guide to hold the centering sleeve in a retracted position. Engagement of the pin in a second groove which extends along the entire length of the cylindrical guide between opposite ends enables the centering sleeve assembly to be completely removed from the tool.

In accordance with further aspects of the invention a standard tool is easily equipped with the centering sleeve assembly by mounting the cylindrical guide on the shank. The guide may be made of metal in which case it is affixed to the tool shank by any appropriate means. Alternatively, the cylindrical guide may be plastic molded directly on the outer surface of the shank, one or more protrusions from the shank outer surface securing the guide in place.

In accordance with still further aspects of the invention the insertion of the working tip through the sleeve assembly each time the removed assembly is reinstalled may be facilitated by positioning a cylindrical retainer between the spring which biases the sleeve and the sleeve pin. A lip at one end of the retainer provides for more positive engagement between one end of the spring and the pin, and the retainer may extend along a portion of the inside of the spring to prevent engagement of the tip with the various spring coils.

BRIEF DESCRIPTION OF THE DRAWING

The novel features of this invention, as well as the invention itself, both as to its organization and method of operation, may best be understood from a reading of the following description, taken in connection with the accompanying drawing, in which:

FIG. 1 is a perspective view of a conventional screwdriver equipped with a removable centering sleeve assembly in accordance with the invention;

FIG. 2 is an end view of the centering sleeve assembly and screwdriver shank of FIG. 1 with the sleeve in an operative position (the screwdriver handle 12 is not shown);

FIG. 3 is a side view of the arrangement of FIG. 2, partially broken away along a section line 3–3;

FIG. 4 is an end view of the centering sleeve assembly and screwdriver shank of FIG. 1 with the centering sleeve in a retracted position;

FIG. 5 is a side view of the arrangement of FIG. 4, partially broken away along a section line 5–5;

FIG. 6 is an end view of the centering sleeve and screwdriver shank of FIG. 1 with the sleeve positioned for removal from the shank;

FIG. 7 is a side view of the arrangement of FIG. 6, partially broken away along a section line 7–7;

FIG. 8 is an end view of the guide mounted on the screwdriver shank;

FIG. 9 is a side view of the guide of FIG. 8 with the screwdriver shank having the same orientation as in FIGS. 2 and 3;

FIG. 10 is a side view of the guide of FIG. 8 with the screwdriver shank having the same orientation as in FIGS. 4 and 5;

FIG. 11 is a perspective view of the cylindrical retainer shown in the arrangement of FIGS. 3, 5 and 7;

FIG. 12 is a sectional view of a sleeve guide molded on the screwdriver shank taken along line 12—12 of FIG. 9;

FIG. 13 is a combined side view partially broken away of an alternative embodiment of the invention with the screwdriver shank having the same orientation as in FIGS. 2 and 3; and FIG. 14 is a perspective view of a cylindrical retainer employed in the embodiment of FIG. 13.

DESCRIPTION OF THE PREFERRED EMBODIMENTS

Centering sleeve assemblies in accordance with the invention can be used with a wide variety of standard tools, both power and hand driven, which have a shank ending in a working tip. For example, the assemblies may be used with a hand-held power tool which can perform a variety of different operations with different bits installed in the shank end. However, for the sake of simplicity the preferred embodiments of the invention are hereafter described in conjunction with a conventional screwdriver as shown in FIG. 1.

In FIG. 1 is illustrated a screwdriver 10 having a handle 12 and a shank 14. Mounted on the shank 14 of the screwdriver is a removable centering sleeve assembly 16 which includes a sleeve guide 18 mounted on the screwdriver shank 14 and a hollow, generally cylindrically shaped centering sleeve 20 slidably and concentrically mounted on the shank 14. The centering sleeve 20 is shown in FIG. 1 in its operative position with the tip and blade of the screwdriver 10 recessed inwardly from the lower open end 22 of the centering sleeve 20.

FIGS. 2 through 7 illustrate the removable centering sleeve assembly in three different positions relative to the screwdriver shank 14. As shown in FIG. 3 the end of the shank 14 opposite the handle of the screwdriver converges into a tip 30 which includes a blade 32 for insertion within a slot in a screw head. The single blade 32 is shown for illustrative purposes only and it should be understood that the embodiments hereafter described can be used with other types of screwdrivers as for example a Phillips head screwdriver. The centering sleeve 20 has a hollow interior 34; a first portion 36 of which has a diameter slightly larger than the diameter of the shank 14 and which extends from the lower open end 22 along approximately one-half of the length of the sleeve 20. A second portion 38 of the hollow interior 34 which has a diameter substantially greater than the diameter of the shank 14 extends from the upper open end 40 along the remainder of the length of the centering sleeve 20. The first and second portions 36 and 38 of the sleeve hollow interior meet at the approximate midway point along the length of the sleeve, the differences in diameter forming an annular shoulder 42.

A pin 44 extends through the centering sleeve 20 adjacent the upper open end 40 in a direction substantially normal to the longitudinal axis of the shank 14. The pin 44 which extends almost to the outer surface of the shank engages with the sleeve guide 18 to position the centering sleeve 20 in its various alternative positions. The sleeve guide 18 is a hollow generally cylindrically shaped member mounted concentrically on the outside of the shank 14. The sleeve guide 18 has a lower end 46 adjacent the screwdriver tip 30 and an upper end 48 opposite the tip 30. A hollow generally cylindrically shaped retainer 50 which is shown in detail in FIG. 11 is slidably concentrically mounted between the wall of the upper portion 38 of the sleeve hollow interior and the screwdriver shank 14. The outer diameter of the retainer 50 is slightly less than the diameter of the upper hollow interior portion 38 while the inner diameter of the retainer is substantially greater than the diameter of the screwdriver shank 14, thereby providing space between the shank and the inner wall of the retainer. The upper end of the retainer 50 includes a radially inwardly extending lip 52 which abuts the lower end 46 of the sleeve guide 18.

Before proceeding further with a description of FIGS. 3, 5, 7 and 13 it should be understood that these views are only partial sectional views. Those portions of the views slightly below the pin 44 have been broken away with the critical areas of the guide 18 in engagement with the pin 44 being shown in phantom.

With the guide 18 rigidly mounted on the shank 14, the centering sleeve 20 is urged in a direction toward the screwdriver tip 30 by a coil spring 54 which extends between the annular shoulder 42 and the side of the retainer lip 52 opposite the lower end 46 of the sleeve guide 18. A portion of the coil spring 54 resides within the retainer 50. The travel of the centering sleeve 20 under the urging of the coil spring 54 is limited by the engagement of the pin 44 with guide 18, the portion of the guide which is engaged by the pin determining the position of the centering sleeve. When the centering sleeve 20 is in its operative position as shown in FIGS. 2 and 3, the pin 44 is engaged with and resides within a first groove 60 which comprises a slot extending from the upper end 48 along a portion of the length of the guide 18 in a direction substantially parallel to the axis of elongation of the screwdriver shank 14. The pin 44 is forced into engagement with the closed end 62 of the first groove 60 by the action of the coil spring 54. The downward movement of the centering sleeve 20 is thus limited but the sleeve may be moved in an upward direction against the urging of the coil spring 54. When the lower open end 22 of the centering sleeve is positioned over a screw head, a downward force exerted on the screwdriver handle overcomes the force of the coil spring 54 to slide the centering sleeve 20 upward relative to the shank 14 as necessary to permit engagement of the screwdriver blade 32 with the mating slot in the screw head. As shown in FIGS. 1, 3, 5 and 7, the lower open end 22 of the centering sleeve is flared outwardly from the lower end of the hollow interior first position 36. The flared lower open end 22 enhances engagement of and alignment of the centering sleeve 20 with the screw head and permits its use with screw heads of different diameters and various configurations including, but not limited to, flat, round and oval heads.

The centering sleeve 20 thus seeks a slot in the screw head, prevents the tip of the screwdriver from slipping out of the slot, and permits the operator to advance his grip on the screwdriver handle while the tip remains indexed to the screw head and its slot. Only one hand of the operator is required for most work applications and the centering sleeve expedites screw insertion or removal in limited access areas and in areas which cannot be seen by the operator. In the event the screwdriver blade 32 is considerably smaller than the length of the slot in the screw head, the centering sleeve with its flared lower open end maintains engagement of the blade within the slot despite considerable misalignment between the axes of the screw and the screwdriver, thereby permitting the use of a screwdriver which would be considered too small under ordinary circumstances.

Occasionally it may be necessary that the centering sleeve 20 be held in a retracted position away from the screwdriver tip 30. By way of example, retraction may be necessitated in a situation where the operator must be able to see the screwdriver tip and visually follow its insertion into a screw head or other appropriate item. The centering sleeve 20 is shown in its retracted position in FIGS. 4 and 5. Located at the upper end 48 of the sleeve guide 18 and removed approximately 120° relative to the longitudinal axis of the shank from the first groove 60 is a ridged portion 70. The guide 18 contains a second groove 72 which comprises a slot extending between the lower and upper ends 46 and 48 of the guide in a direction substantially parallel to the axis of elongation of the screwdriver shank 14. As best shown in FIG. 8, the second groove 72 is located relative to the axis of elongation from both the first groove 60 and the ridged portion 70. The first and second grooves 60 and 72 essentially divide the hollow cylindrical guide 18 into two segments 74 and 76 respectively comprising approximately one-third and two-thirds of the circumference of the guide. The segment 74 is longer than the segment 76 such that at the upper end 48 of the sleeve guide, the segment 74 extends further along the shank 14 than does the segment 76.

It should be understood that the first and second grooves 60, 72 and the ridged portion 70 are illustrated as being approximately 120° removed from one another for purposes of illustration only. The grooves and the ridged portion can be arranged in any desired order and spaced at any suitable angular position commensurate with relative ease of manufacture.

With the shank 14 pushed downwardly relative to the centering sleeve 20 as far as the spring 54 will allow, the pin 44 will clear the segment 76 but not the segment 74 at the upper end 48 of the sleeve guide. When the centering sleeve 20 is in its operative position, subsequent compression of the spring 54 removes the pin 44 from the first groove 60. At this point the centering sleeve 20 may be rotated in a clockwise direction (looking downwardly at the centering sleeve assembly from the screwdriver handle) relative to the shank 14 and sleeve guide 18 and at the same time the pressure exerted by the operator may be released allowing the spring 54 to expand. The clockwise rotation of the centering sleeve 20 may be continued until the pin 44 engages the ridged portion 70 in the sleeve guide segment 76. The centering sleeve 20 will thus remain in the retracted position. Should it be desired to again place the centering sleeve in the operative position shown in FIGS. 2 and 3, it is only necessary to rotate the centering sleeve 20 in a counterclockwise direction relative to the shank 14 and sleeve guide 18, the pin 44 sliding along the end of the segment 76 then engaging the first groove 60 and sliding to the groove end 62 under the force of the spring 54.

In the event it is desired to remove the centering sleeve assembly completely from the screwdriver where existing space limitations will only accommodate the screwdriver shank 14 and sleeve guide 18, or where the screwdriver is to be used for prying or other applications which might damage the centering sleeve assembly, the operator holds the centering sleeve 20 with one hand and pushes downwardly on the screwdriver handle to overcome the force of the coil spring 54. When enough force is applied to completely compress the coil spring, the pin 44 will clear the ridged portion 70 of the centering sleeve 20 as the sleeve is rotated in a clockwise direction relative to the screwdriver shank 14. This engages the pin 44 in the second groove 72 which extends along the entire length of the sleeve guide. As the coil spring 54 expands the pin 44 is allowed to slide along the second groove 72 and out of the sleeve guide 18. The spring 54 expands until the retainer lip 52 engages the pin 44 and the centering sleeve assembly is free to be completely removed from the screwdriver shank 14 as shown in FIGS. 6 and 7.

In one embodiment of the removable sleeve assembly constructed in accordance with the invention, the sleeve guide 18 is made of metal. This facilitates fastening the sleeve guide 18 to the screwdriver shank 14 by any appropriate means such as welding or press fitting. Alternatively, as shown in FIG. 12 the sleeve guide 18 may be made of plastic which is molded directly on the screwdriver shank 14. The portions of the screwdriver shank where the sleeve guide is to be located are pinched or otherwise appropriately altered to provide a plurality of metal protrusions 80 extending outwardly from the outer surface of the shank. With the plastic sleeve guide 18 molded in place, the protrusions 80 prevent the sleeve guide from twisting or sliding relative to the screwdriver shank.

The centering sleeve assembly which has been removed from the screwdriver may be again attached to the screwdriver by inserting the screwdriver tip 30 through the upper open end 40 of the centering sleeve and along the inside of the coil spring 54 until the lower sleeve guide end 46 engages the retainer lip 52. The pin 44 is indexed in the lower end of the second groove 72 and the spring 54 is compressed sliding the pin along the groove to a position adjacent the upper guide end 48. The centering sleeve 20 is then rotated in a counterclockwise direction relative to the screwdriver shaft 14 to place the sleeve in the retracted or operative positions as desired.

When the screwdriver tip is inserted through the sleeve upper open end 40 and inside the spring 54 to attach the centering sleeve assembly to the screwdriver, the edges of the blade 32 may engage with or scrape the various coils along the length of the spring if the shank 14 is not aligned with the centering sleeve 20. An alternative embodiment of the invention which avoids this problem, and which is preferred over the embodiment of FIGS. 3, 5 and 7 for this reason, is shown in FIG. 13 with the centering sleeve 20 in the operative position. The arrangement of FIG. 13 is substantially the same as the arrangement illustrated in FIGS. 2 through 7 except that a different retainer 82 is used and the lower portion 36 of the sleeve hollow interior is divided into first and second lower portions 84 and 86. The retainer 82 which is shown in FIG. 14 in detail is a hollow substantially cylindrical body concentrically mounted on the screwdriver shank 14 inside the coil spring 54. The upper end of the retainer 82 includes a radially outwardly extending lip 88 which abuts the guide lower end 46. The first lower portion 84 of the sleeve hollow interior has a diameter slightly greater than the shank diameter and extends from the sleeve lower open end 22 along approximately half the length of the lower portion 36. The second lower portion 86 extends between the first lower portion 84 and the annular shoulder 42, and has a diameter sufficiently larger than the diameter of the shaft so as to accommodate the retainer 82 as it slides down the shank to compress the spring 54. The retainer 82 separates the shank 14 and screwdriver tip 30 from the spring 54 thereby facilitating the installation and removal of the centering sleeve assembly.

The preferred embodiments of the present invention protect the various working parts of the assembly comprising the guide 18, the pin 44, the retainers 50 or 82 and the coil spring 54 from damage or deformation by containing them partly or completely within the centering sleeve 20. The centering sleeve 20 may be fashioned from any appropriate material, plastic being preferred because of the ease with which it can be molded into the desired shape, and because of its tendency not to score or otherwise damage objects which may be close to or in the path of the centering sleeve during use of the screwdriver. Recently developed relatively hard and durable plastics have proven to be particularly well suited for use in fabricating the centering sleeve 20, such plastics including Delrin marketed by E. I. Dupont de Nemours and Company, Lexan marketed by General Electric Company, and Pellethane marketed by Upjohn Company. In addition substantially transparent plastic-like materials such as acrylic and polystyrene are well suited for centering sleeve construction and enable the operator to view the internal working parts. The retainers 50 and 82 are preferably made of metal, but any suitable materials may be used. The sleeve guide 18 can be fabricated of any appropriate material including metal or plastic as previously pointed out.

Although there have been described specific arrangements of a removable and retractable centering sleeve assembly in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:
1. A tool comprising the combination of:
a shank having a working tip at one end thereof;

a hollow, generally cylindrical guide concentrically mounted on the shank;

means defining a first groove in the guide, the first groove extending from the end of the guide opposite the working tip along a portion of the guide;

means defining a second groove in the guide, the second groove extending between the opposite ends of the guide;

a hollow, generally cylindrical sleeve slidably concentrically mounted on the shank and the guide;

means for normally urging the sleeve in a direction away from the guide and toward the working tip; and means extending inwardly from the inner wall of the hollow sleeve for engagement within the first or the second grooves;

whereby with the means which extends inwardly within the first groove the sleeve is held in an operative position relative to the tip, and with the means which extends inwardly engaged within the second groove, the sleeve may be removed from the shank.

2. The invention as defined in claim 1 above, wherein the end of the guide opposite the working tip has a ridged portion for engagement with the means extending inwardly from the inner wall of the sleeve to hold the sleeve in a retracted position relative to the tip.

3. The invention as defined in claim 2 above, wherein the first and second grooves comprise slots in the guide which extend in directions substantially parallel to the axis of elongation of the shank.

4. The invention as defined in claim 3 above, wherein; the guide is made of metal; and
the sleeve is made of plastic.

5. The invention as defined in claim 3 above, wherein; the shank has at least one protrusion at the outer surface thereof; and
the guide is plastic molded about the outer surface of the shank and the protrusion.

6. The invention as defined in claim 3 above, wherein; the means extending inwardly from the inner wall of the sleeve comprises a pin extending through at least a portion of the hollow cylindrical sleeve and inwardly from the inner wall of the sleeve;
the inner wall of the hollow cylindrical sleeve has an annular shoulder; and
the means for urging comprises a coil spring slidably concentrically mounted on the shank and extending between the annular shoulder and the pin.

7. The invention as defined in claim 6 above, further including a hollow cylindrical retainer slidably concentrically mounted between the coil spring and the shank and having a radially outwardly extending lip at one end thereof disposed between the guide and the coil spring.

8. The invention as defined in claim 6 above, further including a hollow cylindrical retainer slidably concentrically mounted between the coil spring and the inner wall of the sleeve and having a radially inwardly extending lip at one end thereof disposed between the guide and the coil spring.

9. A centering sleeve assembly comprising the combination of:

a hollow, generally cylindrical sleeve having an inner wall with an annular shoulder, said wall being flared outwardly at one end of the sleeve;

a pin extending through at least a portion of the hollow sleeve and inwardly from the inner wall of the sleeve;

a coil spring slidably concentrically mounted within the sleeve and extending between the annular shoulder and the pin; and a hollow, generally cylindrical guide having an outer diameter which is smaller than the inner diameter of at least a portion of the cylindrical sleeve, a first slot which extends between opposite ends of the guide, a second slot which extends from one end of the guide along a portion of the length of the guide, and a ridged portion at one end of the guide.

10. The invention as defined in claim 9 above, further including a hollow cylindrical retainer slidably concentrically mounted within the coil spring and having a radially outwardly extending lip at one end thereof disposed adjacent the end of the coil spring opposite the annular shoulder.

References Cited

UNITED STATES PATENTS

| | | | |
|---|---|---|---|
| 2,796,100 | 6/1957 | Dierker | 145—52 |
| 3,068,922 | 12/1962 | Hill | 145—52 |

ROBERT C. RIORDON, *Primary Examiner.*

R. V. PARKER, JR., *Assistant Examiner.*